(12) United States Patent
Furuta

(10) Patent No.: US 12,238,849 B2
(45) Date of Patent: Feb. 25, 2025

(54) RADICAL GENERATION DEVICE AND ION SPECTROMETER

(71) Applicant: SHIMADZU CORPORATION, Kyoto (JP)

(72) Inventor: Masaji Furuta, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 196 days.

(21) Appl. No.: 18/026,245

(22) PCT Filed: Apr. 26, 2021

(86) PCT No.: PCT/JP2021/016638
§ 371 (c)(1),
(2) Date: Mar. 14, 2023

(87) PCT Pub. No.: WO2022/059247
PCT Pub. Date: Mar. 24, 2022

(65) Prior Publication Data
US 2023/0363076 A1 Nov. 9, 2023

(30) Foreign Application Priority Data
Sep. 15, 2020 (JP) ................. 2020-154317

(51) Int. Cl.
*H05H 1/30* (2006.01)
*G01N 27/623* (2021.01)
*H01J 49/26* (2006.01)

(52) U.S. Cl.
CPC ............ *H05H 1/30* (2013.01); *G01N 27/623* (2021.01); *H01J 49/26* (2013.01)

(58) Field of Classification Search
None
See application file for complete search history.

(56) References Cited

U.S. PATENT DOCUMENTS

| 2007/0210038 | A1* | 9/2007 | Fujii | H05H 1/30 |
| | | | | 219/121.48 |
| 2016/0281670 | A1* | 9/2016 | Ikeda | H05H 1/46 |
| 2019/0333748 | A1* | 10/2019 | Takahashi | H05H 1/463 |

(Continued)

FOREIGN PATENT DOCUMENTS

| CN | 102413627 A | 4/2012 |
| JP | 2019-191081 A | 10/2019 |

OTHER PUBLICATIONS

Extended European Search Report issued Feb. 6, 2024 in European Application No. 21868934.7.

(Continued)

*Primary Examiner* — Wilson Lee
(74) *Attorney, Agent, or Firm* — Sughrue Mion, PLLC

(57) ABSTRACT

A radical generation device includes: a cylindrical tube; an antenna; an outer conductor part; and a connection part which has a double cylindrical tube structure including an inner cylindrical body and an outer cylindrical body, end portions of the inner cylindrical body and the outer cylindrical body on the same side are divided in a circumferential direction notches extending in an axial direction to form divided pieces, and tapered portions swelling outward toward a tip end are formed on an outer side of the divided pieces or tapered portions swelling inward toward a tip end are formed on an inner side of the divided pieces.

5 Claims, 5 Drawing Sheets

(56) References Cited

U.S. PATENT DOCUMENTS

2019/0373710 A1* 12/2019 Ando ............... H01J 37/32174
2020/0086291 A1    3/2020 Sasai et al.
2022/0040665 A1*  2/2022 Brandolese .......... H05H 1/4622

OTHER PUBLICATIONS

Yuji Shimabukuro et al., "Microwave excitation of a low-energy atomic hydrogen", Plasma Sources Sci. Technol., 2020, vol. 29, No. 015005, pp. 1-7 (8 pages total).
Yuji Shimabukuro et al., "Tandem Mass Spectrometry of Peptide Ions by Microwave Excited Hydrogen and Water Plasmas", Analytical Chemistry, May 24, 2018, pp. 7239-7245, vol. 90.
Yuji Shimabukuro, "Comprehensive Study on the Low-energy Atomic Hydrogen Beam: From Production to Velocity Distribution Measurement", Doshisha University Academic Repository, Nov. 2019, 175 pgs.
International Search Report for PCT/JP2021/016638 dated, Jul. 13, 2021 (PCT/ISA/210).
Written Opinion of the International Searching Authority for PCT/JP2021/016638 dated, Jul. 13, 2021 (PCT/ISA/237).

* cited by examiner

RADICAL GENERATION DEVICE AND ION SPECTROMETER

CROSS REFERENCE TO RELATED APPLICATIONS

This application is a National Stage of International Application No. PCT/JP2021/016638 filed Apr. 26, 2021, claiming priority based on Japanese Patent Application No. 2020-154317 filed Sep. 15, 2020.

TECHNICAL FIELD

The present invention relates to a radical generation device and an ion spectrometer that dissociates and analyzes ions using radical species generated by the device.

BACKGROUND ART

Conventionally, a mass spectrometer has been known with which ions derived from sample component are irradiated with radical species such as hydrogen radicals, oxygen radicals, and nitrogen radicals so that the ions are dissociated, and mass spectrometry of the product ions generated by the dissociation is performed (see, for example, Patent Literature 1 and Non Patent Literature 1). For example, by performing a dissociation operation using such radical species on an ion derived from a peptide, various types of product ions reflecting the structure of the peptide such as the amino acid sequence can be generated. The structure of the peptide can be estimated by analyzing mass spectrum in which the product ions are observed.

There are several forms of radical generation devices, but it is preferable that a radical generation device to be mounted on the mass spectrometer as described above is as small and lightweight as possible. As such radical generation devices, radical generation devices described in Non Patent Literatures 1 and 2 and the like are known. In these radical generation devices, a spiral antenna made of a conductor is wound around a capillary tube made of a dielectric material such as quartz, and microwave power is supplied to the spiral antenna, so that discharge is caused in the capillary tube by eddy current to generate plasma. In addition, a magnet that generates a strong magnetic field is disposed outside the capillary tube, and the density of the plasma is increased and stabilized by electron cyclotron resonance (ECR) using the magnetic field. This radical generation device is called an electron cyclotron resonance-localized inductively coupled plasma (ECR-LICP) type because local inductive discharge and resonance cyclotron resonance are used to generate and maintain plasma.

CITATION LIST

Patent Literature

Patent Literature 1: JP 2019-191081 A

Non Patent Literature

Non Patent Literature 1: Yuji Shimabukuro and four others, "Tandem Mass Spectrometry of Peptide Ions by Microwave Excited-Hydrogen and Water Plasmas", Analytical Chemistry, 2018, Vol. 90, No. 12, pp. 7239-7245
Non Patent Literature 2: Yuji Shimabukuro, "Comprehensive Study on the Low-energy Atomic Hydrogen Beam: From Production to Velocity Distribution Measurement" (PHD thesis text), [online], [Searched on Apr. 8, 2020], Doshisha University Academic Repository, Internet

SUMMARY OF INVENTION

Technical Problem

In the radical generation device of the above-described ECR-LICP type, an outer conductor of a substantially cylindrical shape is provided outside the spiral antenna of a spiral shape (inner conductor), the outer conductor being coaxial with the spiral antenna and being grounded. Then, a portion of the spiral antenna and the outer conductor are electrically connected by a conductive component inserted into the gap between the spiral antenna and the outer conductor, so that a resonance circuit of the ECR is configured.

In such a configuration, the position of the portion of the spiral antenna that is electrically connected to the outer conductor needs to be adjusted in an axial direction for each device such that appropriate resonance occurs in the ECR resonance circuit. Thus, there has been a strong demand for an adjustment mechanism capable of easily adjusting the connection position, while achieving stable electrical connection between the spiral antenna and the outer conductor.

The present invention solves such a problem, and a main object of the present invention is to provide a radical generation device that is simple in adjusting a resonance state for plasma generation and can stably generate radical species with high efficiency.

Another object of the present invention is to provide an ion spectrometer capable of favorably performing a structural analysis of a sample by ion dissociation operation using radical species generated using such a radical generation device.

Solution to Problem

One mode of a radical generation device according to the present invention is a radical generation device including:
a cylindrical tube made of a dielectric material and having an inside into which a plasma raw material is introduced;
an antenna made of a conductor material and wound around the cylindrical tube;
an outer conductor part having an inside into which the cylindrical tube is inserted, and having a conductive inner peripheral surface being coaxial with the cylindrical tube and having a cross section which is concentric circular; and
a connection part which is a cylindrical shape body inserted into a gap between the inner peripheral surface of the outer conductor part and an outer peripheral surface of the cylindrical tube, and is in contact with the inner peripheral surface of the outer conductor part together with the antenna to electrically connect the outer conductor part and the antenna; in which
the connection part has a double cylindrical tube structure including an inner cylindrical body and an outer cylindrical body, end portions of the inner cylindrical body and the outer cylindrical body on the same side are divided in a circumferential direction by notches extending in an axial direction to form a plurality of divided pieces, and tapered portions swelling outward toward a tip end are formed on an outer side of each divided piece of the inner cylindrical body or tapered portions swelling inward toward a tip end are formed on an inner side of each divided piece of the outer cylindrical body.

One mode of an ion spectrometer according to the present invention is an ion spectrometer using the one mode of the radical generation device according to the above-described invention, the ion spectrometer including:

a reaction section configured to irradiate ions derived from a target sample with radical species generated by the radical generation device to dissociate the ions; and an analysis section configured to separate ion species generated in the reaction section corresponding to a parameter which characterizes individual ion species, and detect the ion species.

Here, the parameter which characterizes the individual ion species can be a mass-to-charge ratio of ions (formally written, italicized "m/z"), ion mobility, or the like. The above-described reaction chamber can be, for example, an ion trap or a collision cell.

Advantageous Effects of Invention

In the above mode of the radical generation device according to the present invention, for example, the tapered portions swelling outward toward the tip end are formed on the outer side of the divided pieces of the inner cylindrical body of the connection part. From a state where the inner cylindrical body is inserted inside the outer cylindrical body to a position where the tip portion of the outer cylindrical body does not reach the tapered portions of the inner cylindrical body, when the outer cylindrical body is advanced in the axial direction with respect to the inner cylindrical body (or conversely, the inner cylindrical body is retracted in the axial direction with respect to the outer cylindrical body), the tip ends of the divided pieces of the outer cylindrical body come into contact with the tapered portions of the inner cylindrical body. Then, when the outer cylindrical body is further advanced in the axial direction with respect to the inner cylindrical body from this state, the tapered portions of the inner cylindrical body press the divided pieces of the outer cylindrical body outward, and the divided pieces of the outer cylindrical body are bent outward (that is, widened). Conversely, the divided pieces of the outer cylindrical body press the tapered portions of the inner cylindrical body inward, and the divided pieces of the inner cylindrical body are bent inward.

That is, each of the divided pieces of the inner cylindrical body and the outer cylindrical body included in the connection part functions as a plate spring elastically deformable inward and outward. Consequently, the divided pieces of the inner cylindrical body are in contact with the antenna on the inner side of the inner cylindrical body, while the divided pieces of the outer cylindrical body are in contact with the inner peripheral surface of the outer conductor part. Conversely, since the divided pieces of the inner cylindrical body receive a reaction force from the antenna and the divided pieces of the outer cylindrical body receive a reaction force from the outer conductor part, the contact between the tip portions (tapered portions) of the inner cylindrical body and the tip portions of the outer cylindrical body are also enhanced. As a result, the portion that is a specific position in the axial direction of the antenna and the inner peripheral surface of the outer conductor part are electrically connected via the connection part in a stable manner.

In this manner, with the radical generation device according to the above mode of the present invention, the connection point via the connection part can be fixed at any desired position in the axial direction of the antenna. In addition, it is possible to ensure stable electrical contact between the antenna and the outer conductor part via the connection part and to reliably conduct the antenna and the outer conductor part to each other. Consequently, the radical generation device can be easily adjusted to a state in which resonance due to ECR is favorably generated, and the state can be maintained. As a result, plasma is stably generated inside the cylindrical tube, and desired radical species can be stably and efficiently generated using the plasma.

In addition, with the ion spectrometer according to the above mode of the present invention, since a sufficient amount of radical species can be stably supplied to the reaction chamber, ions derived from the target sample can be dissociated with high efficiency, and various product ions can be generated. Thereby, information useful for structural analysis of the component (compound) contained in the target sample can be collected, and the analysis can be performed with high accuracy.

DESCRIPTION OF EMBODIMENTS

Hereinafter, a radical generation device that is an embodiment of the present invention and a mass spectrometer as an example of an ion spectrometer using the radical generation device will be described with reference to the accompanying drawings.

Figure 1:
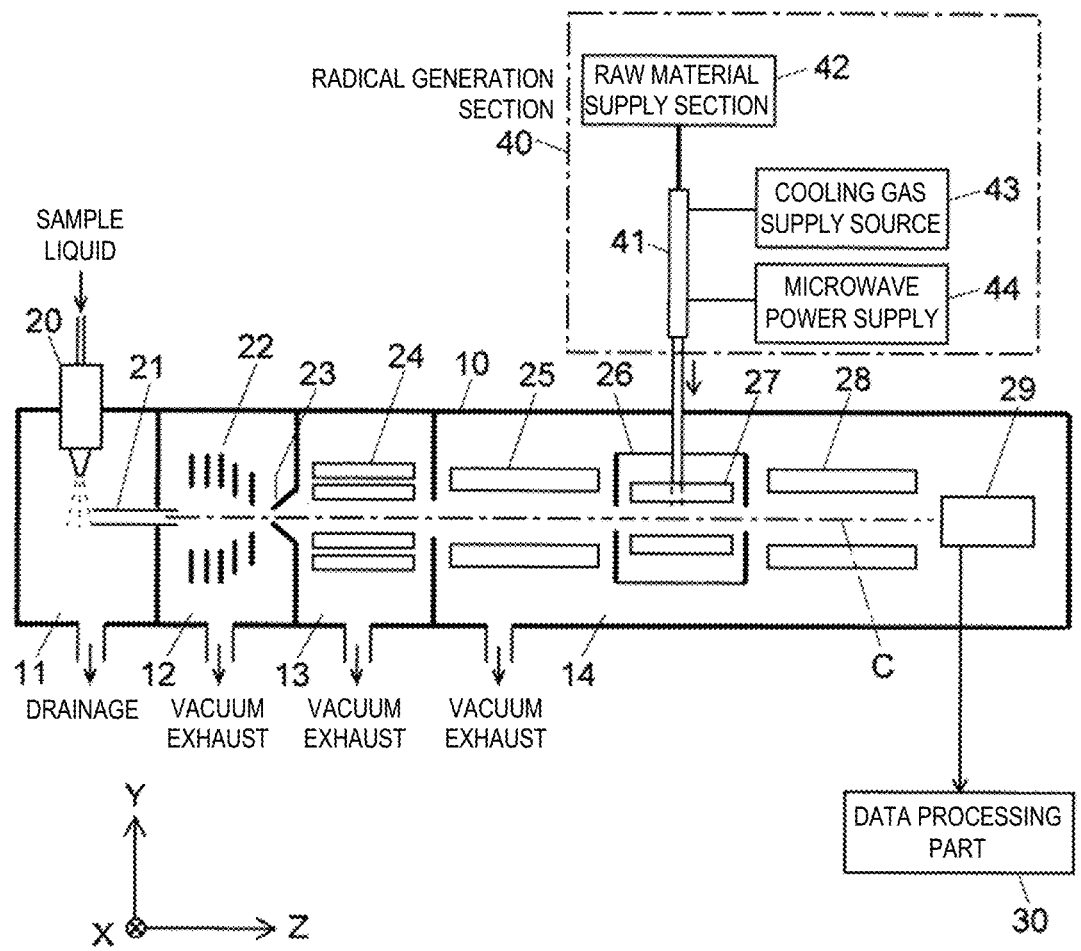
FIG. 1 is a schematic configuration diagram of a mass spectrometer which is a mode of an ion spectrometer according to the present invention.

FIG. 1 is a schematic configuration diagram of a mass spectrometer according to the present embodiment. This mass spectrometer is a triple quadrupole mass spectrometer including an atmospheric pressure ion source. The mass spectrometer has a front stage often connected to a liquid chromatograph (LC), and is used as a liquid chromatograph mass spectrometer.

As illustrated in FIG. 1, the mass spectrometer includes an ionization chamber 11 and a vacuum chamber 10. The inside of the ionization chamber 11 is a substantially atmospheric pressure atmosphere. The inside of the vacuum chamber 10 is divided into a plurality of sections, and the respective divided chambers are vacuum-exhausted by a vacuum pump (a rotary pump and/or a turbo-molecular pump) which is not illustrated, and are a first intermediate vacuum chamber 12, a second intermediate vacuum chamber 13, and an analysis chamber 14. That is, the mass spectrometer has a configuration of a multi-stage differential exhaust system in which the degree of vacuum sequentially increases from the ionization chamber 11 in a substantially atmospheric pressure atmosphere to the analysis chamber 14 in a high vacuum atmosphere.

An electrospray ionization (ESI) probe 20 is installed in the ionization chamber 11, and an eluate (sample solution) eluted from a column of LC is introduced into the ESI probe 20, for example. The ionization chamber 11 and the first intermediate vacuum chamber 12 communicate with each other through a desolvation tube 21 having a small diameter. A kind of ion guide 22 called a Q array is disposed inside the first intermediate vacuum chamber 12. The first intermediate vacuum chamber 12 and the second intermediate vacuum chamber 13 communicate with each other via a small hole formed at a top of a skimmer 23. An ion guide 24 of a multipole type is disposed in the second intermediate vacuum chamber 13.

A front quadrupole mass filter 25, a collision cell 26, a rear quadrupole mass filter 28, and an ion detector 29 are disposed along an ion optical axis C that is linear in the inside of the analysis chamber 14 maintained at a high degree of vacuum. Each of the front quadrupole mass filter and the rear quadrupole mass filter 28 has four rod electrodes disposed in parallel to the ion optical axis C to surround the ion optical axis C, and has a function of selecting ions according to a mass-to-charge ratio. A radical generation section 40 is connected to the collision cell 26, and the collision cell 26 has a function of dissociating ions by radical species such as oxygen radicals supplied from the radical generation section 40. A multipole ion guide 27 is disposed inside the collision cell 26 to surround the ion optical axis C. Detection signals by the ion detector 29 is input to a data processing part 30 which is actually a computer.

A typical MS/MS analysis operation in the mass spectrometer of the present embodiment will be schematically described.

The ESI probe 20 nebulizes a supplied sample liquid into the ionization chamber 11 while applying a charge to the sample liquid. A sample component in the nebulized charged droplets is ionized in a process in which the droplets are micronized and the solvent is vaporized. The generated ions derived from the sample component are sucked into the desolvation tube 21 with a gas flow produced by a pressure difference between both ends of the desolvation tube 21, and are sent to the first intermediate vacuum chamber 12. The ions incident on the first intermediate vacuum chamber 12 advance substantially along the ion optical axis C, pass through the ion guide 22, an orifice of the skimmer 23, and the ion guide 24 of a multipole type, are sent to the analysis chamber 14, and are introduced into the front quadrupole mass filter 25.

A voltage obtained by combining a DC voltage applied from a power source which is not illustrated and radio-frequency voltage is applied to a plurality of rod electrodes constituting the front quadrupole mass filter 25, and only ions having a specific mass-to-charge ratio corresponding to this voltage selectively pass through the front quadrupole mass filter 25, and are introduced into the collision cell 26. Radical species such as oxygen radicals are supplied to the inside of the collision cell 26 from the radical generation section 40, and ions (generally referred to as precursor ions) introduced into the collision cell 26 react with the radical species and dissociate. Various types of product ions generated by the dissociation are converged by the action of an electric field formed by the ion guide 27, exit from the collision cell 26, and are introduced into the rear quadrupole mass filter 28.

A voltage obtained by combining a DC voltage and a radio-frequency voltage is applied to a plurality of rod electrodes constituting the rear quadrupole mass filter 28 similarly to the front quadrupole mass filter 25, and only product ions having a specific mass-to-charge ratio corresponding to this voltage selectively pass through the rear quadrupole mass filter 28, and reach the ion detector 29. The ion detector 29 outputs detection signals corresponding to the amount of incident ions to the data processing part 30.

For example, when it is desired to perform quantitative analysis of a sample component in which both mass-to-charge ratios of precursor ions and product ions are known, the mass-to-charge ratios of ions respectively selected by the front quadrupole mass filter 25 and the rear quadrupole mass filter 28 are fixed, and specific product ions generated from such specific precursor ions are repeatedly detected. That is, multiple reaction monitoring (MRM) measurement for combination of the specific mass-to-charge ratios is repeated. The data processing part 30 creates a chromatogram (extracted ion chromatogram) based on detection signals obtained by repeating the MRM measurement, and calculates concentration (content) of a target sample component from an area of a peak observed in the chromatogram.

In addition, the mechanism of ion dissociation using the reaction between radical species such as oxygen radicals and ions performed in the collision cell 26 is not a purpose of the present specification, and is described in various documents in addition to Patent Literature 1, and thus is omitted here.

Next, a configuration of the radical generation section 40 configured to supply radical species such as oxygen radicals to the collision cell 26 will be described in detail.

The radical generation section 40 is the radical generation device of the above-described ECR-LICP type, and includes a plasma generation part 41, a raw material supply section 42, a cooling gas supply source 43, and a microwave power supply 44 as illustrated in FIG. 1.

Figure 2:
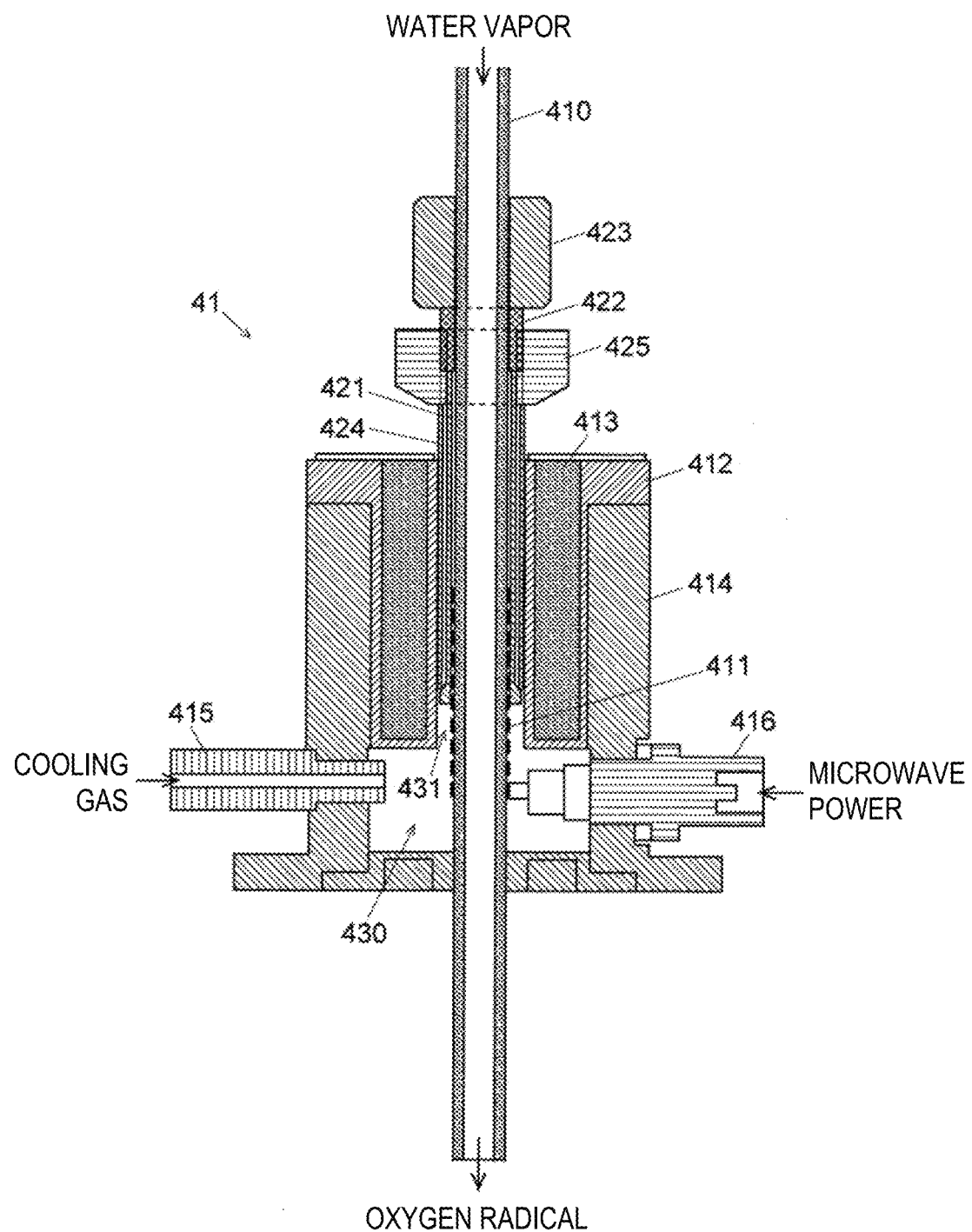
FIG. 2 is a schematic sectional view of a radical generation section in the mass spectrometer of the present embodiment.
Figure 3:
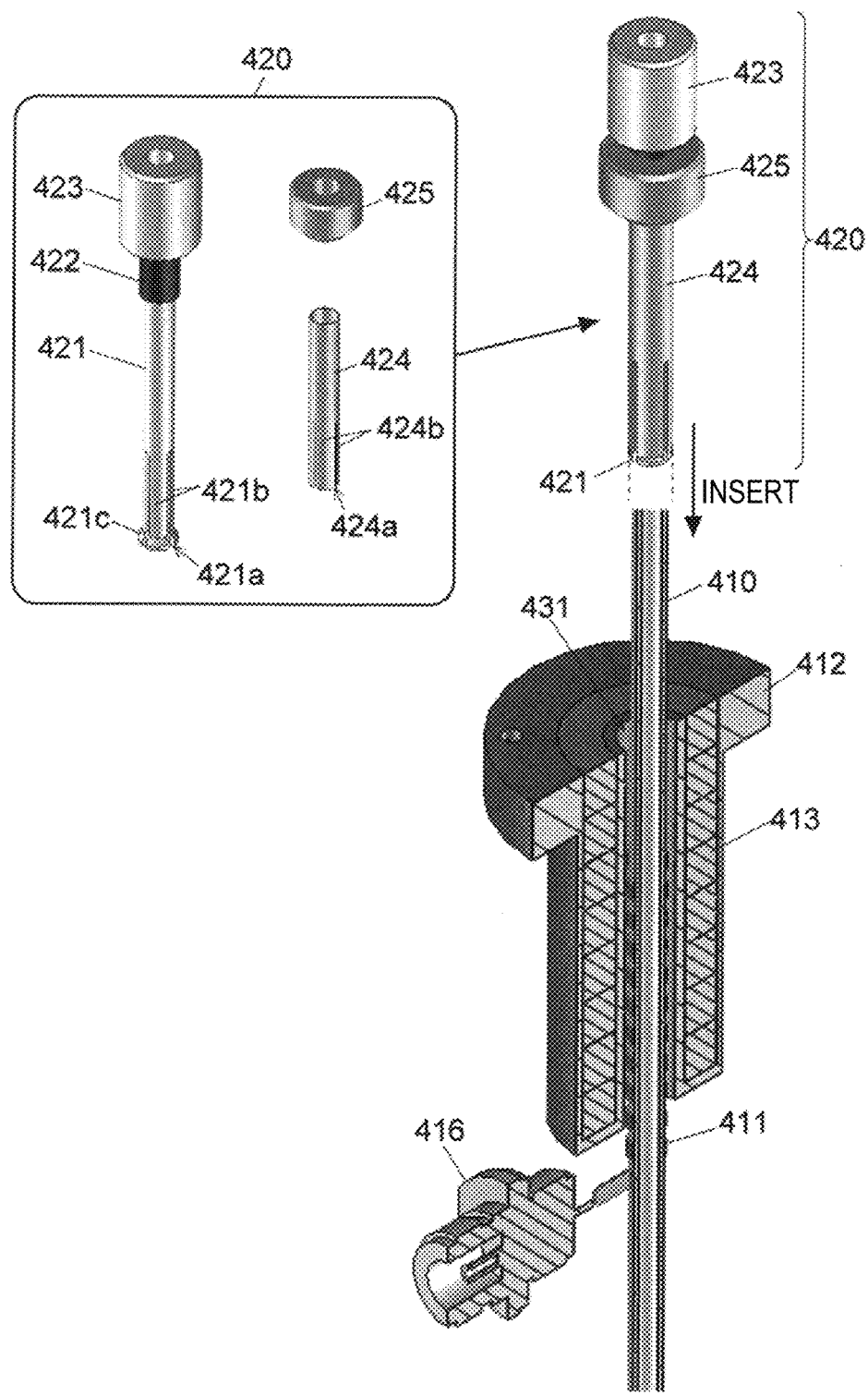
FIG. 3 is a schematic sectional perspective view of the main part of the radical generation section illustrated in FIG. 2.
Figure 4:
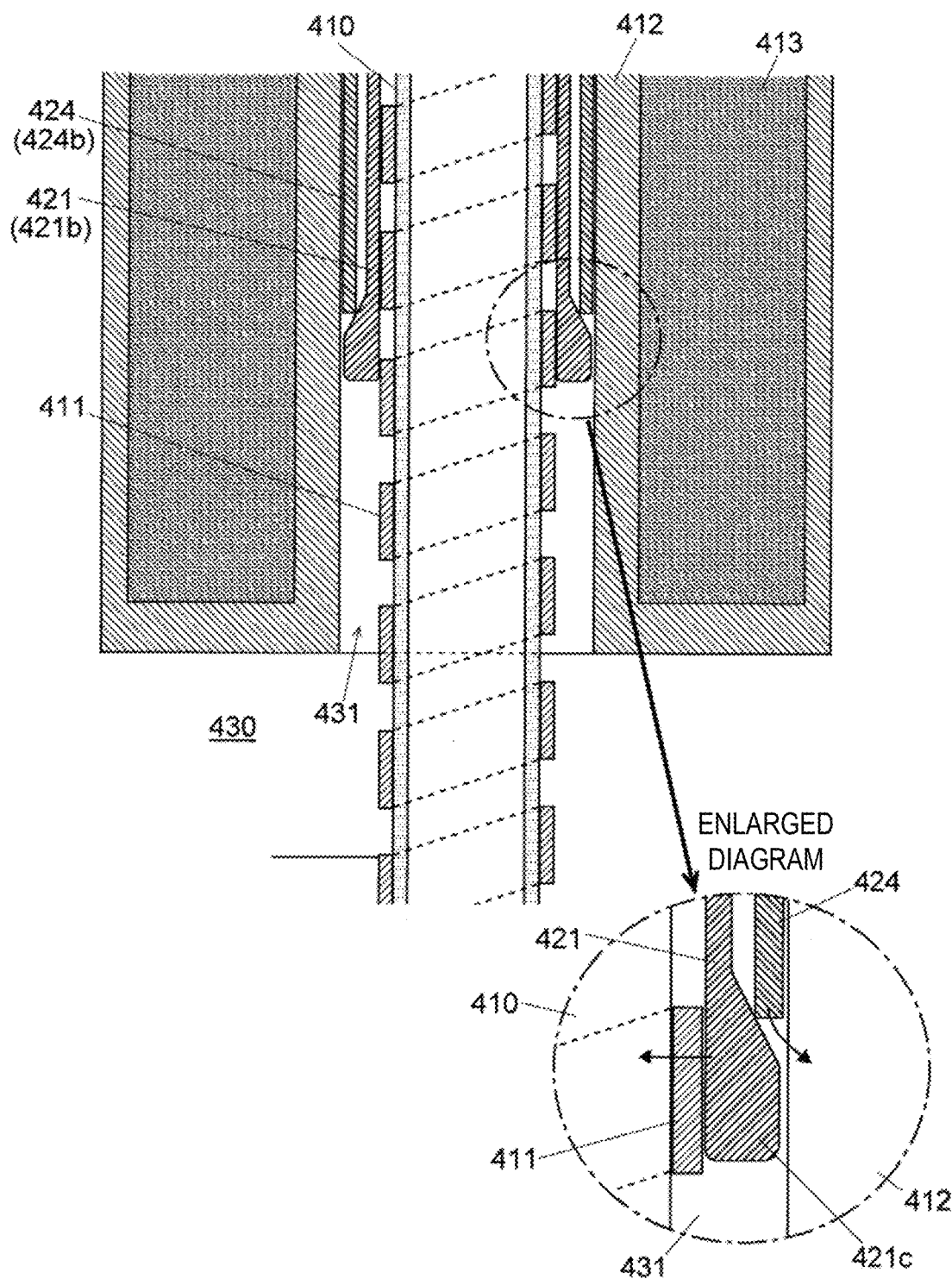
FIG. 4 is an enlarged sectional view of the main part of the radical generation section illustrated in FIG. 2.
Figure 5A:
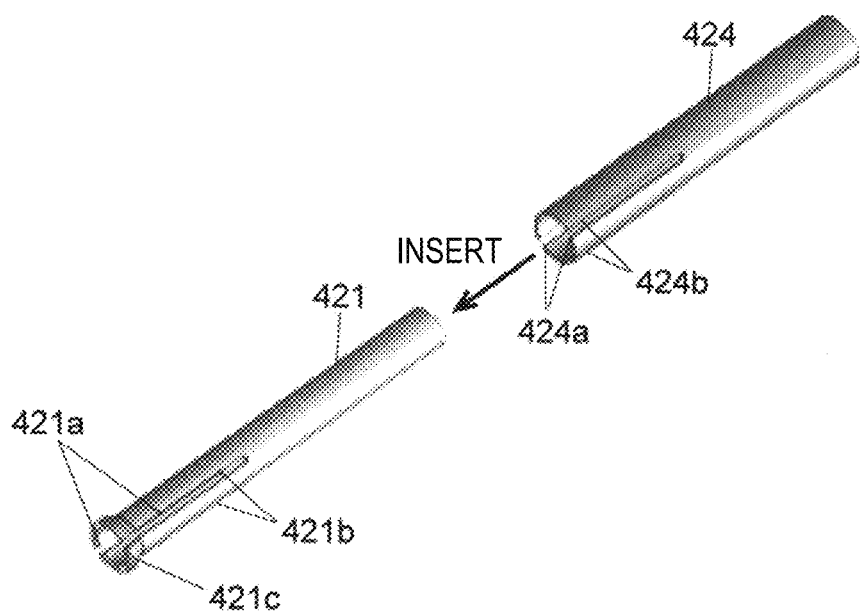
FIGS. 5A and 5B are perspective partial sectional views each illustrating a structure of a resonator adjustment mechanism included in the radical generation section.
Figure 5B:
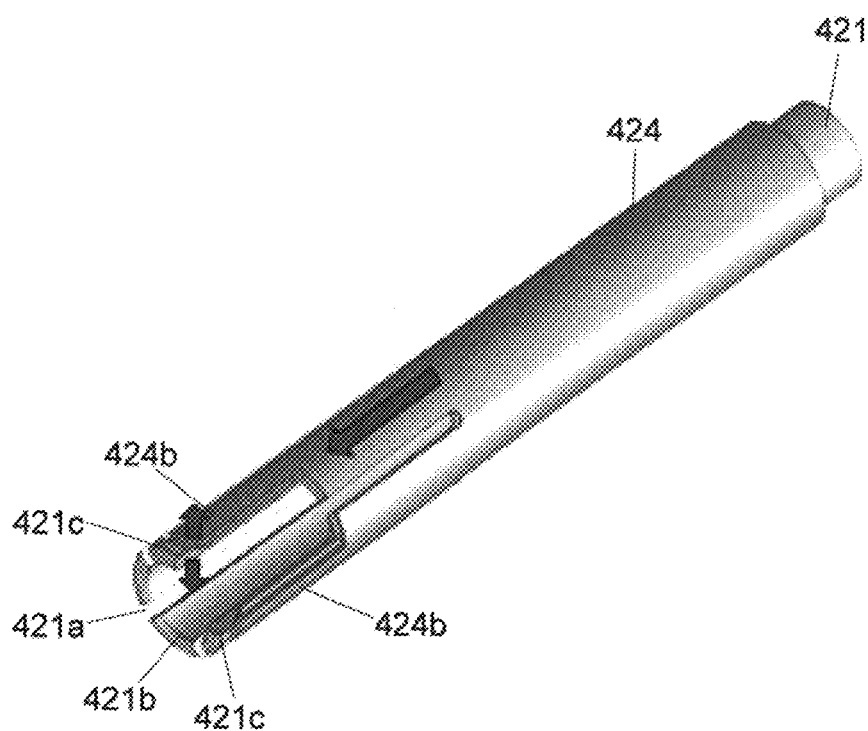

FIG. 2 is a schematic sectional view schematically illustrating a structure of the plasma generation part 41 in the radical generation section 40. FIG. 3 is a schematic sectional perspective view of part of the plasma generation part 41. FIG. 4 is an enlarged sectional view of the part of the plasma generation part 41. FIGS. 5A and 5B are partial sectional perspective views each illustrating a structure of a resonator adjustment mechanism which is part of the plasma generation part 41.

The plasma generation part 41 generates plasma on the basis of the plasma raw material supplied from the raw material supply section 42, and sends radical species generated in the plasma to the outside, specifically, to the collision cell 26. The cooling gas supply source 43 is configured to supply appropriately pressurized cooling gas. The microwave power supply 44 is configured to supply power for generating plasma. Here, the plasma raw material is water vapor.

The plasma generation part 41 includes: a central cylindrical tube 410 made of quartz (or other dielectric material) which is an insulator and a dielectric; a spiral antenna 411 which is a belt-shaped conductor (usually metal) spirally wound around the central cylindrical tube 410; an outer conductor part 412 which is coaxial with the central cylindrical tube 410 and has a cylindrical opening whose inner diameter is slightly larger than an outer diameter of the central cylindrical tube 410, the outer conductor part 412 made of a conductor material; a permanent magnet 413 embedded in the outer conductor part 412; a casing 414 which holds the outer conductor part 412, a microwave supply connector 416 attached to the casing 414; a cooling gas connection part 415 similarly attached to the casing 414; and a resonator adjustment mechanism 420 including an inner cylinder 421 and an outer cylinder 424 described later. For the spiral antenna 411, for example, a material (oxygenfree copper, tough pitch copper, or the like) close to pure copper having high conductivity and formability is used. In addition, it is preferable that gold plating is applied to a surface of the spiral antenna 411 in order to prevent oxidation.

Inside of the central cylindrical tube 410 is a raw material introduction tube, into which water vapor as a plasma raw material is introduced, and is also a plasma generation chamber. The microwave supply connector 416 is a coaxial connector, and is connected to the microwave power supply 44 via a coaxial cable, which is not illustrated. The conductive line of the coaxial connector is connected to one end of the spiral antenna 411. In addition, although not illustrated, the outer conductor part 412 is grounded. As will be described later, part of the spiral antenna 411 and the outer conductor part 412 are electrically connected via the resonator adjustment mechanism 420, and the spiral antenna 411 is grounded at the connection position. The spiral antenna 411, the outer conductor part 412, the resonator adjustment mechanism 420, and the like constitute a resonator of the ECR. The microwave power supply 44 supplies power to the resonator via the coaxial cable and the microwave supply connector 416.

In the radical generation section 40, radical species are generated as follows.

Water vapor generated in the raw material supply section 42 is supplied to the central cylindrical tube 410. The microwave power supply 44 supplies a microwave electric current having a frequency of 2.45 GHz to the spiral antenna 411. Then, induction discharge due to action of the electric current flowing through the spiral antenna 411 occurs, and plasma using water vapor as a raw material is locally generated in the axial direction along the inner wall of the central cylindrical tube 410. In addition, when the resonator is adjusted by the resonator adjustment mechanism 420 so that the electron cyclotron frequency of the electrons moving around the magnetic field by the permanent magnet 413 coincides with the frequency of the microwave, the density of the plasma is increased and stabilized by the ECR. Along with the introduction of new water vapor, radical species such as oxygen radicals in the plasma are transported in the central cylindrical tube 410 and released from an open end at a terminal of the central cylindrical tube 410.

At this time, a cooling gas is introduced from the cooling gas supply source 43 into a connection chamber 430 through the cooling gas connection part 415. The cooling gas passes through notches 421a and 424b of the inner cylinder 421 and the outer cylinder 424, which are spiral antenna holding parts described later, to escape to an upside. This makes it possible to prevent each part such as the spiral antenna 411 from overheating when the radical species are continuously generated. Moreover, even when the spiral antenna 411 is a metal that is easily oxidized, this configuration also has an effect of preventing the oxidation. In a case where the spiral antenna 411 is gold-plated, there is no fear of oxidation, and thus air can be used as it is as the cooling gas. On the other hand, when the spiral antenna 411 is not gold-plated, preferably an inert nitrogen gas is used as the cooling gas.

As illustrated in FIG. 3, the resonator adjustment mechanism 420 configured to adjust the resonator of the ECR includes the inner cylinder 421 and the outer cylinder 424 having a coaxial double cylindrical tube structure, and a movable knob 425. The inner cylinder 421 is longer than the outer cylinder 424 by a predetermined length. Both the inner cylinder 421 and the outer cylinder 424 are elastically deformable components, and preferably a copper alloy (beryllium copper, phosphor bronze, and the like) for a spring is used. In addition, in order to reduce the contact resistance, it is preferable to perform gold plating on the surfaces of the inner cylinder 421 and the outer cylinder 424. Note that, for convenience, regarding the inner cylinder 421 and the outer cylinder 424, an end portion (an end portion of a lower side in FIG. 3) on a side inserted in advance into the central cylindrical tube 410 is referred to as a tip portion, and an end portion on an opposite side is referred to as a base portion.

As illustrated in FIGS. 5A and 5B, the tip portion of the inner cylinder 421 is divided into a plurality of portions by the notches 421a parallel to the axis to form divided pieces 421b. In this example, the number of divided pieces 421b is four, but this is not limited as long as this number is three or more. Tapered portions 421c gradually swelling outward from the base portion side toward the tip portion are formed at tip ends of the divided pieces 421b. As illustrated in FIG. 3, a fixing knob 423 is attached to the base portion of the inner cylinder 421, and a male screw part 422 is provided on an outer periphery of the inner cylinder 421 over a range of a predetermined length in the axial direction from the connection end with the fixing knob 423.

On the other hand, the tip portion of the outer cylinder 424 is divided into a plurality of portions by the notches 424a parallel to the axis to form divided pieces 424b, similarly to the inner cylinder 421. In this example, the number of divided pieces 424b is four, but this is not limited as long as this number is three or more. The number of the divided pieces 421b and the number of the divided pieces 424b do not need to be the same. The divided pieces 421b and 424b at the respective tip portions of the inner cylinder 421 and the outer cylinder 424 function as plate springs independent from each other. The movable knob 425 has a through hole with an inner peripheral surface provided with a female screw part into which the male screw part 422 of the inner cylinder 421 is screwed.

As illustrated in FIGS. 3 and 5, in use, the movable knob 425 is attached such that the male screw part 422 of the inner cylinder 421 is screwed into the female screw part, and the inner cylinder 421 is inserted into inside of the outer cylinder 424. When the inner cylinder 421 is inserted into inside of the outer cylinder 424, the divided pieces 421b are elastically deformed inward such that the tapered portions 421c do not become obstacles.

As illustrated in FIG. 3, a user inserts the inner cylinder 421 and the outer cylinder 424 of the resonator adjustment mechanism 420 in an integrated state into the gap 431 between the spiral antenna 411 around the central cylindrical tube 410 and the inner peripheral surface of the outer conductor part 412. At this time, the divided pieces 421b and 424b of the inner cylinder 421 and the outer cylinder 424 are not elastically deformed, and the inner cylinder 421 and the outer cylinder 424 are smoothly inserted while a very small gap between the inner peripheral surface of the inner cylinder 421 and the spiral antenna 411 is being kept and the outer peripheral surface of the outer cylinder 424 slides on the inner peripheral surface of the outer conductor part 412.

As illustrated in FIG. 4, when a tip of the outer cylinder 424 is in contact with the tapered portions 421c of the inner cylinder 421, the spiral antenna 411 is grounded at a portion where the inner cylinder 421 which is elastically deformed is in contact. When a grounding position of the spiral antenna 411 changes in the axial direction, the resonance state changes, and a state of plasma generated changes. Thus, the user changes the grounding position of the spiral antenna 411 by moving the entire resonator adjustment mechanism 420, to find a position where plasma is favorably generated. Whether plasma is favorably generated can be determined by monitoring, for example, an electric current supplied from the microwave power supply 44. In addition, whether plasma is favorably generated may be able to be determined, for example, by attaching an adapter with a glass for confirmation to one of the plurality of cooling gas connection parts 415, to make it possible to visually confirm light emission in orange when plasma is generated from the adapter.

Then, when finding an optimum grounding position of the spiral antenna 411, the user rotates the movable knob 425 while holding the fixing knob 423 and fixing the position of the inner cylinder 421. Then, the movable knob 425 pushes the base portion of the outer cylinder 424 to axially advance the outer cylinder 424 with respect to the inner cylinder 421. As illustrated in FIGS. 4 and 5, since the tip ends of the divided pieces 424*b* of the outer cylinder 424 abut on and push the tapered portions 421*c* of the inner cylinder 421, the divided pieces 421*b* of the inner cylinder 421 are elastically deformed inward. Conversely, the divided pieces 424*b* of the outer cylinder 424 are elastically deformed outward. Consequently, the divided pieces 421*b* of the inner cylinder 421 are in contact with the spiral antenna 411, and the divided pieces 424*b* of the outer cylinder 424 are in contact with the inner peripheral surface of the outer conductor part 412. In addition, since the divided pieces 421*b* and 424*b* are pushed by the spiral antenna 411 and the outer conductor part 412, respectively, the divided pieces 421*b* of the inner cylinder 421 and the divided pieces 424*b* of the outer cylinder 424 are also strongly brought into contact.

In this way, the electrical connection is improved at each contact surface, and the contact position in the axial direction is fixed, so that the plasma is continuously generated favorably. When the adjustment of the resonator is performed again, the movable knob 425 is turned in a direction opposite to the above direction, and the outer cylinder 424 is retracted in the axial direction with respect to the inner cylinder 421 (pulled up in FIGS. 2 and 4).

As described above, in the mass spectrometer of the present embodiment, it is possible to easily adjust the ECR resonator of the radical generation section 40 such that plasma is favorably generated using the resonator adjustment mechanism 420, that is, radical species are efficiently generated.

In the above description, the adjustment is performed by turning the movable knob 425 by the user, but a drive source configured to automatically turn the movable knob 425 without depending on manual work may be provided. Furthermore, means (circuit) configured to automatically perform adjustment on the basis of a result of monitoring the plasma state or the like may be provided.

In the above embodiment, the tapered portions 421*c* are provided in the inner cylinder 421, but the same adjustment can be performed by providing the tapered portions in the outer cylinder 424.

In addition, although the mass spectrometer of the above embodiment is a triple quadrupole mass spectrometer, it is obvious that the present invention can also be applied to other types of mass spectrometers including a collision cell or an ion trap that dissociates ions using radical species. Specifically, the present invention is also applicable to, for example, quadrupole-time-of-flight mass spectrometer, an ion trap mass spectrometer, an ion trap time-of-flight mass spectrometer, and the like.

In addition, it is obvious that the present invention is also applicable to an ion mobility analyzer, an ion mobility-mass spectrometer, or the like that separates ions dissociated using radical species according to ion mobility and detects the ions.

Furthermore, the above-described embodiments and modified examples are examples of the present invention, and it is a matter of course that modifications, corrections, additions, and the like appropriately made within the scope of the gist of the present invention are included in the claims of the present application.

Various Modes

It is understood by those skilled in the art that the plurality of exemplary embodiments described above are specific examples of the following modes.

(Clause 1) One mode of a radical generation device according to the present invention is a radical generation device including:

a cylindrical tube made of a dielectric material and having an inside into which a plasma raw material is introduced;

an antenna made of a conductor material and wound around the cylindrical tube;

an outer conductor part having an inside into which the cylindrical tube is inserted, and having a conductive inner peripheral surface being coaxial with the cylindrical tube and having a cross section which is concentric circular; and a connection part which is a cylindrical shape body inserted into a gap between the inner peripheral surface of the outer conductor part and an outer peripheral surface of the cylindrical tube, and is in contact with the inner peripheral surface of the outer conductor part together with the antenna to electrically connect the outer conductor part and the antenna; wherein the connection part has a double cylindrical tube structure including an inner cylindrical body and an outer cylindrical body, end portions of the inner cylindrical body and the outer cylindrical body on a same side are divided in a circumferential direction notches extending in an axial direction to form a plurality of divided pieces, and tapered portions swelling outward toward a tip end are formed on an outer side of the divided pieces of the inner cylindrical body or tapered portions swelling inward toward a tip end are formed on an inner side of the divided pieces of the outer cylindrical body.

In the radical generation device according to Clause 1, the plurality of divided pieces respectively formed on the inner cylindrical body and the outer cylindrical body function as plate springs, and when the outer cylindrical body is moved relative to the inner cylindrical body in the axial direction, the inner cylindrical body and the outer cylindrical body are brought into contact with the antenna and the outer conductor by the action of the plate springs. Therefore, with the radical generation device according to Clause 1, a connection point via the connection part can be fixed at any desired position in an axial direction of the antenna. Simultaneously, it is possible to ensure stable electrical contact between the antenna and the outer conductor part via the connection part and to reliably conduct the antenna and the outer conductor part to each other. Consequently, the device can be easily adjusted to a state in which resonance due to ECR is favorably generated, and the state can be maintained. As a result, plasma is stably generated inside the cylindrical tube, and desired radical species can be stably and efficiently generated using the plasma.

(Clause 2) The radical generation device according to Clause 1 may be configured such that the tapered portions swelling outward toward the tip end are formed on the outer side of each divided piece of the inner cylindrical body, and the connection part includes a moving mechanism configured to move the outer cylindrical body toward a direction to the tip portion with respect to the inner cylindrical body.

With the radical generation device according to Clause 2, the outer cylindrical body can be moved to fix the position of the connection part while a position where the divided pieces of the inner cylindrical body are in contact with the antenna is maintained. Therefore, adjustment of the device as described above is easy.

(Clause 3) The radical generation device according to Clause 2 may be configured such that the moving mechanism includes a movable knob which is movable with respect to the inner cylindrical body in an axial direction of the inner cylindrical body and pushes the outer cylindrical body.

(Clause 4) The radical generation device according to Clause 3 may be configured such that the movable knob is screwed to the outer peripheral surface of the inner cylindrical body, and the outer cylindrical body is pressed by rotating the movable knob.

With the radical generation devices described in Clauses 3 and 4, the mechanism of adjustment is simple, and the cost can be easily reduced. In addition, work is easy even when the user manually performs adjustment.

(Clause 5) One mode of an ion spectrometer according to the present invention is an ion spectrometer using the radical generation device according to any one of Clauses 1 to 4, the ion spectrometer including:
a reaction section configured to irradiate ions derived from a target sample with radical species generated by the radical generation device to dissociate the ions; and
an analysis section configured to separate ion species generated in the reaction section corresponding to a parameter which characterizes individual ion species, and detect the ion species.

With the ion spectrometer according to Clause 5, since a sufficient amount of radical species can be stably supplied to the reaction chamber, ions derived from the target sample can be dissociated with high efficiency, and various product ions can be generated. Thereby, information useful for structural analysis of the component (compound) contained in the target sample can be collected, and the analysis can be performed with high accuracy.

REFERENCE SIGNS LIST

10 . . . Vacuum Chamber
11 . . . Ionization Chamber
12 . . . First Intermediate Vacuum Chamber
13 . . . Second Intermediate Vacuum Chamber
14 . . . Analysis Chamber
20 . . . Electrospray Ionization (ESI) Probe
21 . . . Desolvation Tube
22, 24, 27 . . . Ion Guide
23 . . . Skimmer
25 . . . Front Quadrupole Mass Filter
26 . . . Collision Cell
28 . . . Rear Quadrupole Mass Filter
29 . . . Ion Detector
30 . . . Data Processing Part
40 . . . Radical Generation Section
41 . . . Plasma Generation Part
410 . . . Central Cylindrical Tube
411 . . . Spiral Antenna
412 . . . Outer Conductor Part
413 . . . Permanent Magnet
414 . . . Casing
415 . . . Cooling Gas Connection Part
416 . . . Microwave Supply Connector
420 . . . Resonator Adjustment Mechanism
421 . . . Inner Cylinder
421a, 424a . . . Notch
421b, 424b . . . Divided Piece
421c . . . Tapered Portion
422 . . . Male Screw Part
423 . . . Fixing Knob
424 . . . Outer Cylinder
425 . . . Movable Knob
430 . . . Connection Chamber
431 . . . Gap
42 . . . Raw Material Supply Section
43 . . . Cooling Gas Supply Source
44 . . . Microwave Power Supply
C . . . Ion Optical Axis

The invention claimed is:

1. A radical generation device comprising:
a cylindrical tube made of a dielectric material and having an inside into which a plasma raw material is introduced;
an antenna made of a conductor material and wound around the cylindrical tube;
an outer conductor part having an inside into which the cylindrical tube is inserted, and having a conductive inner peripheral surface being coaxial with the cylindrical tube and having a cross section which is concentric circular; and
a connection part which is a cylindrical shape body inserted into a gap between the inner peripheral surface of the outer conductor part and an outer peripheral surface of the cylindrical tube, and is in contact with the inner peripheral surface of the outer conductor part together with the antenna to electrically connect the outer conductor part and the antenna; wherein
the connection part has a double cylindrical tube structure including an inner cylindrical body and an outer cylindrical body, end portions of the inner cylindrical body and the outer cylindrical body on a same side are divided in a circumferential direction notches extending in an axial direction to form a plurality of divided pieces, and tapered portions swelling outward toward a tip end are formed on an outer side of the divided pieces of the inner cylindrical body or tapered portions swelling inward toward a tip end are formed on an inner side of the divided pieces of the outer cylindrical body.

2. The radical generation device according to claim 1, wherein the tapered portions swelling outward toward the tip end are formed on the outer side of the divided pieces of the inner cylindrical body, and the connection part includes a moving mechanism configured to move the outer cylindrical body toward a direction to the tip portion with respect to the inner cylindrical body.

3. The radical generation device according to claim 2, wherein the moving mechanism includes a movable knob which is movable with respect to the inner cylindrical body in an axial direction of the inner cylindrical body and pushes the outer cylindrical body.

4. The radical generation device according to claim 3, wherein the movable knob is screwed to an outer peripheral surface of the inner cylindrical body, and the outer cylindrical body is pressed by rotating the movable knob.

5. An ion spectrometer using the radical generation device according claim 1, the ion spectrometer comprising:
   a reaction section configured to irradiate ions derived from a target sample with radical species generated by the radical generation device to dissociate the ions; and
   an analysis section configured to separate ion species generated in the reaction section corresponding to a parameter which characterizes individual ion species, and detect the ion species.

\* \* \* \* \*